United States Patent [19]

Robertson

[11] 4,117,825
[45] Oct. 3, 1978

[54] COOKING STAND

[76] Inventor: Thomas Alexander Robertson, Sheldrake Lake, R.R. No. 3, Armdale, Halifax County, Nova Scotia, Canada

[21] Appl. No.: 690,194

[22] Filed: May 26, 1976

[30] Foreign Application Priority Data

Jun. 12, 1975 [CA] Canada .................................. 230081

[51] Int. Cl.² .......................... A47J 33/00; F24B 1/26; F24B 3/00
[52] U.S. Cl. ........................................ 126/29; 99/422; 108/152; 248/222.2; 248/235; 126/9 R; 126/137; 294/15; 294/32
[58] Field of Search .......................... 99/393, 421–422, 99/393, 396; 126/25 A, 25 R, 9, 29–30, 137; 248/121, 122, 124–125, 222.2, 235; 294/2, 15, 26, 32; 108/152; 211/100

[56] References Cited

U.S. PATENT DOCUMENTS

| 121,953 | 12/1871 | Miller | 211/100 |
|---|---|---|---|
| 1,004,312 | 9/1911 | Totty | 294/2 |
| 1,293,237 | 2/1919 | Stovall | 99/393 X |
| 1,940,454 | 12/1933 | Karnes | 108/152 |
| 2,192,102 | 2/1940 | Pinto | 126/30 |
| 2,378,454 | 6/1945 | Werling | 294/15 |
| 2,571,943 | 10/1951 | Ray et al. | 294/26 |
| 2,604,884 | 7/1952 | Walker | 99/393 X |
| 2,633,318 | 3/1953 | Caples | 126/25 A X |
| 2,697,627 | 12/1954 | La Fond | 294/32 |
| 2,698,726 | 1/1955 | Howe | 99/393 X |
| 3,095,869 | 7/1963 | Swenson | 126/25 A |
| 3,267,887 | 8/1966 | Boyd | 108/152 |
| 3,481,267 | 12/1969 | Saiki | 99/393 X |

FOREIGN PATENT DOCUMENTS

| 470,131 | 12/1950 | Canada | 294/15 |
|---|---|---|---|
| 4,217 of | 1907 | United Kingdom | 99/421 HH |

Primary Examiner—Harvey C. Hornsby
Assistant Examiner—Timothy F. Simone

[57] ABSTRACT

A cooking stand and cooking stand assembly are provided which can be readily assembled and dismounted for use indoors or outdoors; the stand comprises an upstanding supporting frame including at least one pair of retaining bars including an upper bar and a lower bar defining a slot therebetween; and a support member having an upper cooking surface and including at least a pair of spaced apart retaining arms extending from one side of the support member and adapted to removably sit in the slot, whereby the support member is held in the frame to dispose the cooking surface horizontally.

2 Claims, 6 Drawing Figures

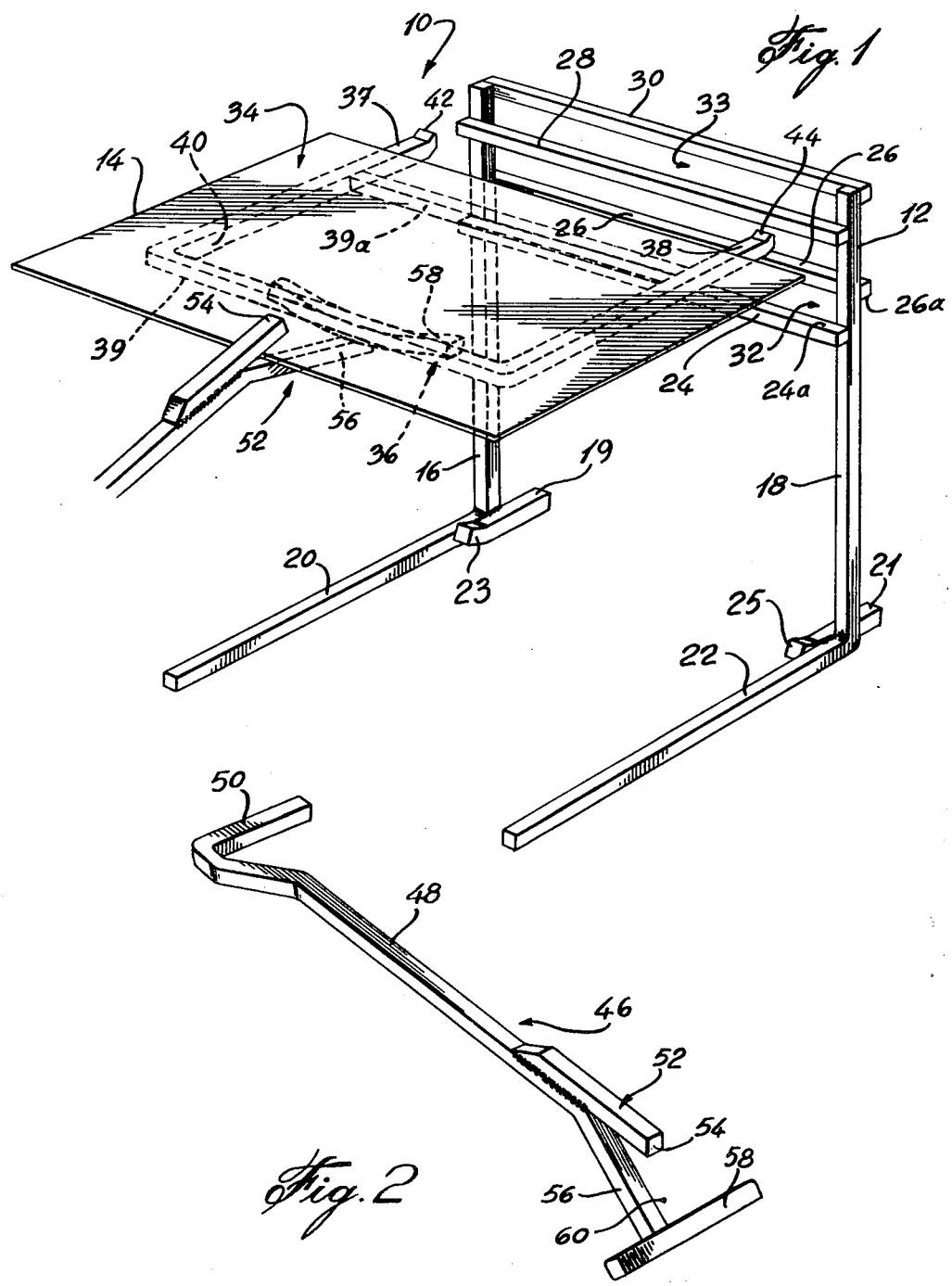

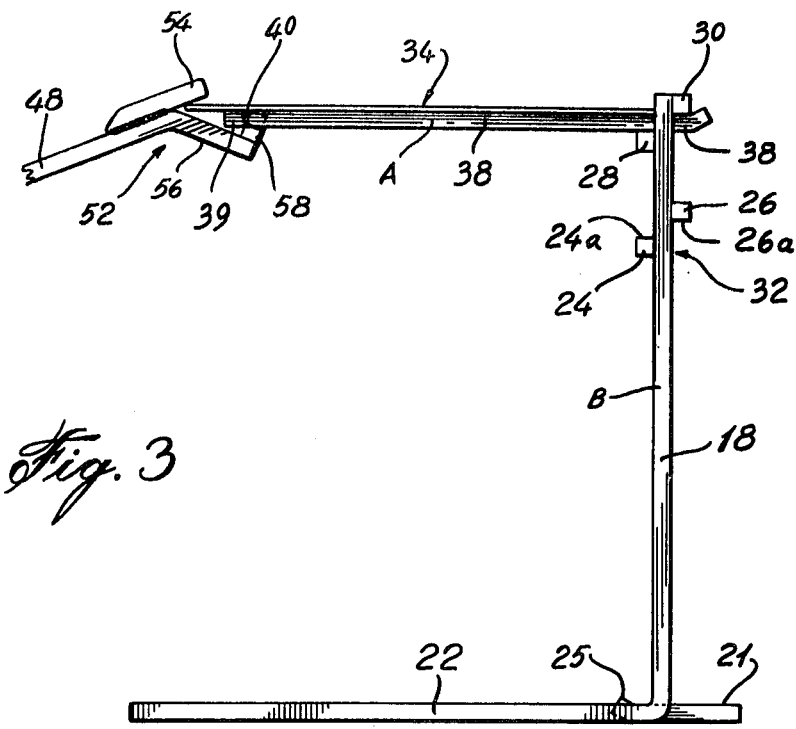
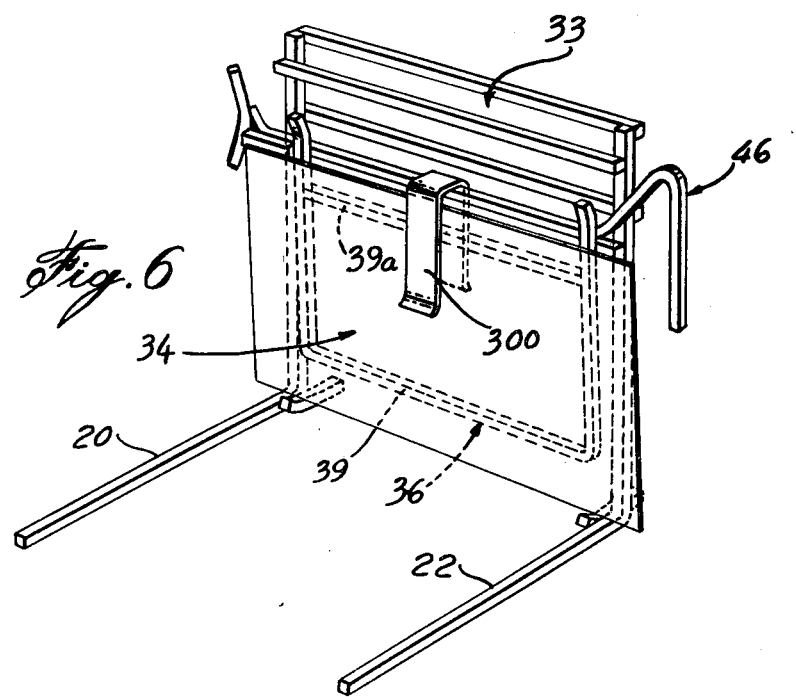

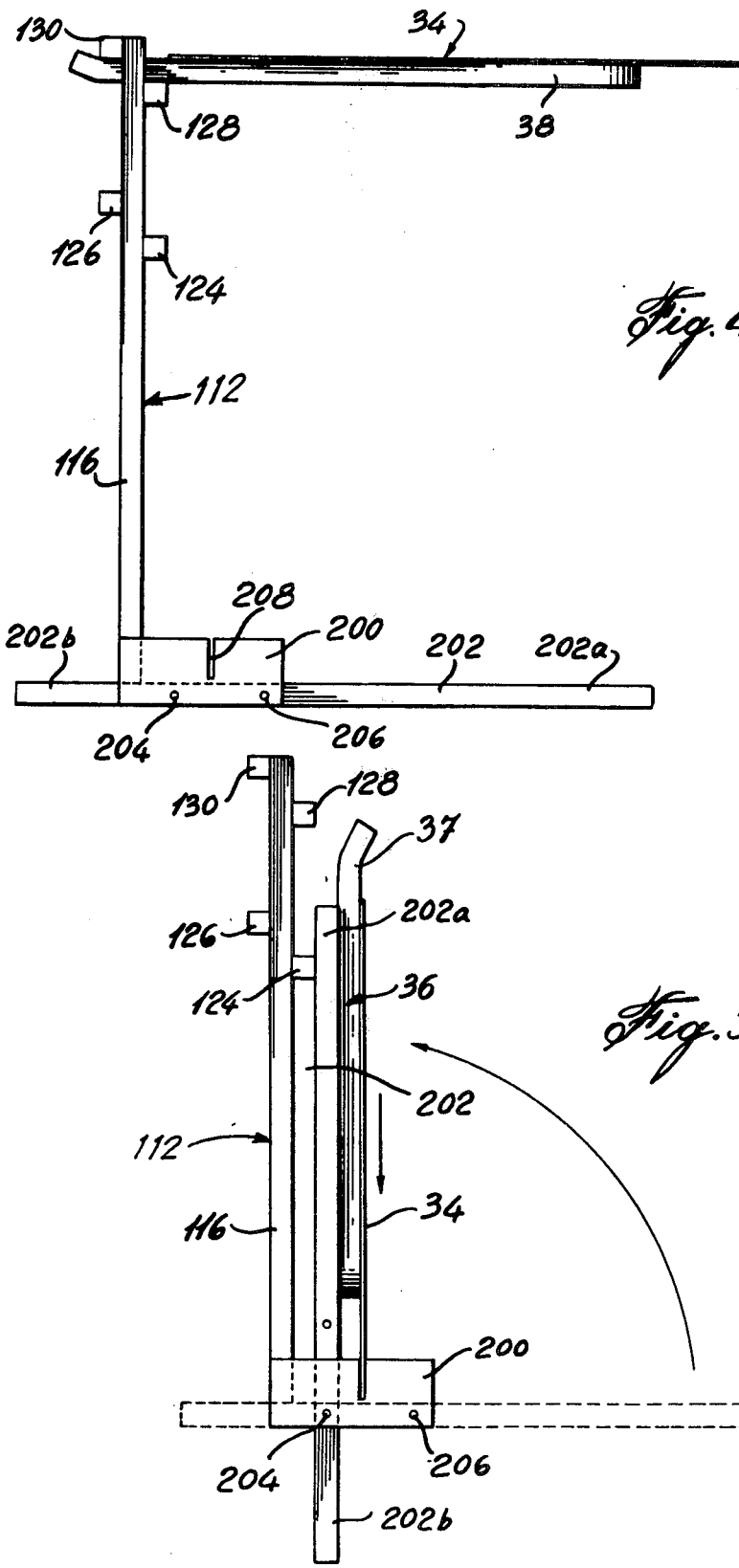

COOKING STAND

BACKGROUND OF THE INVENTION

1. Field of the Invention

This invention relates to a cooking stand and cooking stand assembly; more particularly the invention is concerned with a cooking stand which can be used in a fireplace, barbecue pit or the like, either indoors or outdoors.

2. Description of the Prior Art

Portable grills are known for outdoor cooking particularly for charcoal cooking; grills have also been proposed for use indoors in the confines of a fireplace. Generally such grills have been used either for outdoor cooking or indoor cooking.

There has thus been a need for a versatile cooking assembly which can be used indoors or outdoors and which can be readily assembled and dismantled for storage or transport with a minimum of work.

SUMMARY OF THE INVENTION

It is an object of this invention to provide a cooking stand which is portable and which can be readily assembled and disassembled without the use of nuts and bolts and similar conventional connecting elements.

It is a further object of this invention to provide a cooking stand assembly comprising a cooking stand and a holding device adapted for cooperation with a part of the cooking stand for easy assembly and dismantling of the stand.

It is a further object of this invention to provide a cooking stand assembly which can be readily disassembled and converted to a portable unit occupying a minimum of space.

It is a further object of this invention to provide a portable cooking stand assembly for camping enthusiasts and the like, which can be used for outdoor cooking, but which can also be employed in the home in the confines of a fireplace in times of power failure or to economize on other energy sources such as electricity.

According to one aspect of the invention there is provided a cooking stand comprising an upstanding supporting frame including at least one pair of retaining bars said pair including an upper bar and a lower bar defining a slot therebetween; and a support member having an upper cooking surface and including at least a pair of spaced apart retaining arms extending from one side of said support member and adapted to removably sit in said slot, whereby said support member is held in said frame to dispose said cooking surface horizontally.

According to another aspect of the invention there is provided a cooking stand assembly comprising in combination an upstanding supporting frame including at least one pair of retaining bars said pair including an upper bar and a lower bar defining a slot therebetween; and a support member having an upper cooking surface and including at least a pair of spaced apart retaining arms extending from one side of said support member and adapted to removably sit in said slot, a cavity defined in said support member; and including a holding device adapted to hold said support member, said device having a handle and holding means for said support member; said holding means including an upper jaw and a lower jaw defining a recess therebetween, and a retainer member extending from an outer end of said lower jaw; said recess being adapted to receive said support member with said retainer member extending into said cavity of said support member and an upper edge of said support member being held against the underside of said upper jaw.

BRIEF DESCRIPTION OF THE DRAWINGS

The invention is illustrated in preferred embodiments with reference to the accompanying drawings in which:

FIG. 1 is a perspective view of a cooking stand of the invention;

FIG. 2 is a perspective view of a holding device forming a component of the cooking stand assembly of the invention;

FIG. 3 is a side elevation showing assembly of a cooking stand with a holding device;

FIG. 4 is a side elevation of an alternative upstanding supporting frame of the cooking stand in which the feet of the frame are foldable for transport;

FIG. 5 is a side elevation of the supporting frame of FIG. 4 with the feet in a folded position; and FIG. 6 is a perspective view of the component parts of the cooking stand assembly of FIGS. 1 and 2 in the disassembled, portable configuration.

DESCRIPTION OF THE PREFERRED EMBODIMENTS

With further reference to FIG. 1, a cooking stand 10 comprises a supporting frame 12 and a plate 14.

Supporting frame 12 comprises a pair of spaced apart vertical legs 16 and 18 with horizontal forwardly extending feet 20 and 22 respectively, and horizontal rearwardly extending feet 19 and 21 respectively. Feet 19 and 21 have inner upwardly turned ends 23 and 25 respectively.

Disposed between the legs 16 and 18 is a lower pair of horizontal, parallel retaining bars 24 and 26 and an upper pair of horizontal, parallel retaining bars 28 and 30.

Retaining bar 24 extends forwardly of the legs 16 and 18 and includes a substantially flat upper surface 24a. Retaining bar 26 extends rearwardly of the legs 16 and 18 and includes a substantially flat lower surface 26a. A substantially horizontally disposed slot 32 is defined between surface 24a and surface 26a.

Retaining bars 28 and 30 are disposed in similar manner to retaining bars 24 and 26 respectively and define therebetween a substantially horizontally disposed slot 33.

Plate 14 includes a generally flat upper surface 34 with a retaining member 36 located on its underside.

Retaining member 36 comprises a pair of outwardly extending arms 37 and 38 connected at the underside of plate 14 by connecting arms 39 and 39a (see FIG. 6); connecting arm 39a prevents any tendency of the plate 14 to warp.

The arms 37 and 38 extend outwardly from a side of the plate 14 and have upturned ends 42 and 44 respectively.

With reference to FIG. 2, there is illustrated a holding device 46 comprising an elongated rod 48 having a handle 50 at one end and a holding head 52 at the other.

The head 52 includes an upper jaw 54, a lower jaw 56 which is an extension of the elongated rod 48 and a generally Y-shaped retainer 58 extending from lower jaw 56 towards upper jaw 54, the retainer 58 has a generally concavely curved inner surface. A recess 60 is defined between upper jaw 54 and lower jaw 56.

With reference to FIG. 3, there is shown the cooking stand 10 of FIG. 1 in combination with the holding device 46 of FIG. 2. In FIG. 3 the plate 14 is shown having been placed between retaining bars 28 and 30 of supporting frame 12 by means of holding device 46.

With reference to FIGS. 4 and 5 a supporting frame 112 similar to that shown in FIG. 1, comprises a pair of spaced apart vertical legs 116 and 118 (not visible).

Disposed between the legs 116 and 118 is a lower pair of horizontal, parallel retaining bars 124 and 126 and an upper pair of horizontal, parallel retaining bars 128 and 130.

A hinge plate 200 is mounted on, as by a weld, and extends from the lower end of leg 116. A foot 202 is hingedly mounted on hinge plate 200 by a fixed hinge pin 204 and a removable pin 206; pins 204 and 206 mate with cavities in foot 202.

Foot 202 includes a forwardly extending portion 202a and a shorter rearwardly extending portion 202b.

Hinge plate 200 further includes a notch 208 extending vertically downwardly from an upper edge which is adapted to receive and hold plate 14 (shown in FIG. 1) in the portable carrying configuration.

In order to fold foot 202 from the position shown in FIG. 4 to the configuration shown in FIG. 5, pin 206 is removed whereafter foot 202 is pivoted about hinge pin 204 and can be swung to the position shown in FIG. 5; the outer edge of plate 14 (as shown in FIG. 1) is then inserted in notch 208, thereby stabilizing the folded position of foot 202 adjacent leg 116.

In the embodiment illustrated in FIGS. 4 and 5, leg 118 (not visible) would include a similar hinge plate and foot assembly to leg 116.

With further reference to FIG. 6 there is shown the cooking stand assembly of FIGS. 1 and 2 in the convenient, space saving, portable configuration. As shown in FIG. 6 the three components can form a single portable unit which is held together by a simple U-shaped clip 300 which can be frabricated, for example, of spring steel or polyethylene.

The portable unit shown in FIG. 6 can be carried employing the pair of upper retaining bars 28 and 30 as a handle by inserting the hand in the space between retaining bars 28 and 26.

In the portable unit shown in FIG. 6 the inner upwardly turned ends 23 and 25 of feet 19 and 21 (see FIG. 1) prevent the plate 14 from slipping during transport.

It will be recognized that the supporting frame 112 shown in FIG. 4 permits conversion to an even more compact unit than that illustrated in FIG. 6 as partially shown in FIG. 5.

The invention will be further described by reference to the following description of the use of the cooking stand 10 of the invention.

In use the supporing frame 12 is located astride a source of heat, for example, a charcoal-containing grate (not shown). In this position the legs 16 and 18 of frame 12 are located on either side of the grate with feet 20 and 22 extending toward the cook, and feet 19 and 21 extending away from the cook.

The plate 14 is introduced between retaining bars 28 and 30 of the frame 12 by means of holding device 46.

In order to hold plate 14 in holding device 46 the edge of plate 14 remote from upturned ends 42 and 44 of retaining arms 37 and 38 respectively is inserted into the recess 60 of the device 46. The plate 14 is adjusted within recess 60 so that Y-shaped retainer 58 sits adjacent an inner surface of arm 39 and the underside of plate 14 in a cavity 40. In this position when the plate 14 is disposed generally horizontally the rod 48 of holding device 46 will extend downwardly at an obtuse angle to plate 14, as shown in FIG. 3. In this position when the holding device 46 is held by the handle 50 the edge of flat upper surface 34 of plate 14 contained within recess 60 is held against the underside of upper jaw 54.

With the plate 14 securely held in the holding device 46 the plate is aligned with slot 33 defined between retaining bars 28 and 30. The plate 14 is moved towards slot 33 and the ends of arms 37 and 38 pass through slot 33 until plate 14 is securely located against legs 16 and 18 with arms 37 and 38 extending between retaining bars 28 and 30, the upturned ends 42 and 44 of arms 37 and 38 preventing the plate 14 from sliding free from supporting frame 12.

With plate 14 securely in position the handle 50 of holding device 46 is raised so that the head 52 of device 46 can be removed from plate 14 to leave plate 14 supported by frame 12 over the source of heat.

The flat upper surface 34 may be used as a direct cooking surface or as a supporting surface for a cooking utensil.

At the completion of the cooking operation the holding device 46 is used to dismantle the cooking stand 10 by removal of plate 14. In this operation the holding device 46 is moved towards the forward side of plate 14 with rod 48 in a generally horizontal position and the head 52 is made to slide around the forward edge of the plate 14 to align Y-shaped retainer 58 with the inner surface of arm 39 and the underside of plate 14. The handle 50 of the holding device 46 is then moved in a downward direction until retainer 58 sits securely with the edge of flat upper surface 34 inside recess 60 held against the lower side of upper jaw 54. In this position the plate 14 is supported by holding device 46 and plate 14 can be made to slide out from between retaining bars 28 and 30 of frame 12.

While the invention has been described with reference to a plate 14, it will be appreciated that a grill or rack could be employed in place of plate 14. However, it has been found that a plate is preferable for many uses, particularly when food is being cooked in a cooking utensil supported on the cooking stand 10. In this case the plate 14 prevents direct contact between flames and smoke from the heating source which would blacken the cooking utensils.

Further, plate 14 can be used as a direct cooking surface for cooking foods which a grill or rack would not support, for example, fried eggs. Furthermore the plate 14 has the advantage that it prevents spillage from a cooking utensil or fat from falling directly into the fire.

The cooking stand of the invention can be employed in the open grate of a fire-place in the home during time of power failure or to economize on other more conventional forms of energy currently employed for cooking in the home. The cooking stand can similarly be employed for out-door cooking where its ease of assembly and disassembly, without requiring tools, and its ability to form a compact, spacesaving, portable unit make it ideal.

It will be appreciated by those in the art to whom the specification is directed that the components of the cooking stand assembly of the invention should be fabricated from durable heat and flame resistant materials of appropriate strength having regard to the intended use. Further, plate 14 should be of a good heat conducting material.

Suitably the plate 14 is fabricated from steel of good heat conductivity, the retaining member 36 of plate 14 and the supporting frame 12 and holding device 46 may, however, be fabricated from less expensive materials.

It will also be appreciated by those in the art to whom the specification is directed that some care must be taken in the dimensions of the components of the cooking stand assembly. For example, clearly the thickness of arms 37 and 38 must be less than the vertical distance between retaining bars 28 and 30 and between retaining bars 24 and 26; however, the vertical distance between retaining bars 28 and 30 and between retaining bars 24 and 26 must not be significantly greater than the thickness of arms 37 and 38 since otherwise the plate 14 would not be securely held in frame 12. In some embodiments it may be convenient to make the distance between arms 37 and 38 only slightly greater than the length of retainer 58 in order that the plate 14 be more securely held in holding device 46. In the same manner the head 52 of the device 46 must be appropriately dimensioned.

It will be evident that one skilled in the art to whom the specification is directed will have no problem in ascertaining appropriate dimensions for the components for their assembly and in order that the components can adapt the portable, space-saving configuration, having regard to the foregoing description.

I claim:

1. A cooking stand comprising an upstanding supporting frame comprising a pair of vertically disposed spaced apart legs each having a forwardly extending foot at its lower end, and including at least one pair of horizontally disposed, spaced apart retaining bars, remote from said lower end, said pair including an upper bar having a lower downwardly facing wall and a lower bar having an upper upwardly facing wall defining a horizontal slot therebetween; one of said pair of retaining bars extending outwardly, forwardly of said legs, and the other of said pair extending outwardly, rearwardly of said legs; and a support member comprising a plate having a flat upper cooking surface and including at least a pair of spaced apart retaining arms disposed adjacent opposite side edges of said plate and having upper and lower surfaces, extending from an underside of said plate, said arms being removably supported in said slot with bearing contact between said lower wall of said upper bar and said upper surfaces and between said upper wall of said lower bar and said lower surfaces, whereby said support member is held in said frame to dispose said cooking surface horizontally, such that in use the cooking surface can be located vertically above a source of heat for cooking; each said foot being hingedly mounted on its leg by a hinge element mounted on said let whereby said foot can be pivoted to a compact carrying position adjacent said leg, said hinge element having locking means for locking said foot in a forwardly extending position during use and having a vertically downwardly extending slot defined therein adapted to receive and hold an outer edge of said plate when said foot is in said compact carrying position.

2. A cooking stand assembly comprising in combination an upstanding supporting frame comprising a pair of vertically disposed spaced apart legs each having a forwardly extending foot at its lower end, and including at least one pair of horizontally disposed, spaced apart retaining bars remote from said lower end, said pair including an upper bar having a lower downwardly facing wall and a lower bar having an upper upwardly facing wall defining a horizontal slot therebetween one of said pair of retaining bars extending outwardly, forwardly of said legs, and the other of said pair extending outwardly, rearwardly of said legs; and a support member comprising a plate having a flat upper cooking surface and including at least a pair of spaced apart retaining arms having upper and lower surfaces, extending from an underside of said plate, said retaining arms being removably supported in said slot with bearing contact between said lower wall of said upper bar and said upper surfaces and between said upper wall of said lower bar and said lower surfaces, a cavity defined in said support member, whereby said support member is held in said frame to dispose said cooking surface horizontally, such that in use the cooking surface can be located vertically above a source of heat for cooking; each said foot being hingedly mounted on its leg by a hinge element mounted on said leg whereby said foot can be pivoted to a compact carrying position adjacent said leg, said hinge element having locking means for locking said foot in a forwardly extending position during use and having a vertically downwardly extending slot defined therein adapted to receive and hold an outer edge of said plate when said foot is in said compact carrying position; and including a holding device adapted to hold said support member, said device having a handle and holding means for said support member; said holding means including an upper jaw and a lower jaw defining a recess therebetween, and a retainer member extending from an outer end of said lower jaw; said recess being adapted to receive said support member with said retainer member extending into said cavity of said support member and in bearing contact with said support member, and an upper edge of said support member being held in bearing contact against the underside of said upper jaw.

* * * * *